US008485291B2

(12) United States Patent
O'Neill (10) Patent No.: US 8,485,291 B2
(45) Date of Patent: Jul. 16, 2013

(54) SELF FREQUENCY RAMPING ALTERNATING CURRENT WHEEL MOTOR SYSTEM FOR HYBRID VEHICLES

(76) Inventor: John William O'Neill, Canton, MA (US)

( * ) Notice: Subject to any disclaimer, the term of this patent is extended or adjusted under 35 U.S.C. 154(b) by 1222 days.

(21) Appl. No.: 11/466,088

(22) Filed: Aug. 22, 2006

(65) Prior Publication Data

US 2008/0053722 A1   Mar. 6, 2008

(51) Int. Cl.
*B60K 6/00* (2007.10)
(52) U.S. Cl.
USPC .............. 180/65.22; 180/65.285; 180/65.31; 180/65.51
(58) Field of Classification Search
USPC ................ 180/305, 307, 308, 65.21, 65.22
See application file for complete search history.

(56) References Cited

U.S. PATENT DOCUMENTS

| | | | | |
|---|---|---|---|---|
| 3,623,568 | A * | 11/1971 | Mori | 180/15 |
| RE28,324 | E * | 1/1975 | Greene | 180/22 |
| 3,916,625 | A * | 11/1975 | Holtkamp | 60/421 |
| 4,236,595 | A * | 12/1980 | Beck et al. | 180/243 |
| 4,354,144 | A * | 10/1982 | McCarthy | 318/13 |
| 4,413,698 | A * | 11/1983 | Conrad et al. | 180/305 |
| 4,534,169 | A * | 8/1985 | Hunt | 60/414 |
| 4,570,741 | A * | 2/1986 | McCoy | 180/242 |
| 4,888,949 | A * | 12/1989 | Rogers | 60/434 |
| 4,903,792 | A * | 2/1990 | Ze-ying | 180/308 |
| 4,953,646 | A * | 9/1990 | Kim | 180/65.245 |
| 5,318,142 | A * | 6/1994 | Bates et al. | 180/65.245 |
| 5,495,912 | A * | 3/1996 | Gray et al. | 180/165 |
| 5,810,106 | A * | 9/1998 | McCoy | 180/243 |
| 6,026,921 | A * | 2/2000 | Aoyama et al. | 180/65.25 |
| 6,549,832 | B2 * | 4/2003 | Nakasako et al. | 701/22 |
| 6,834,737 | B2 * | 12/2004 | Bloxham | 180/165 |
| 6,880,654 | B2 * | 4/2005 | Plishner | 180/65.6 |
| 6,892,846 | B2 * | 5/2005 | Mellot et al. | 180/243 |
| 7,096,985 | B2 * | 8/2006 | Charaudeau et al. | 180/65.245 |
| 7,100,723 | B2 * | 9/2006 | Roethler et al. | 180/165 |
| 7,111,704 | B2 * | 9/2006 | Johnson | 180/307 |
| 7,537,075 | B2 * | 5/2009 | Gray et al. | 180/165 |
| 7,594,626 | B2 * | 9/2009 | Soderberg | 244/103 S |
| 7,641,010 | B2 * | 1/2010 | Mizutani et al. | 180/65.51 |
| 2005/0067838 | A1 * | 3/2005 | Gray, Jr. | 290/40 C |

* cited by examiner

*Primary Examiner* — J. Allen Shriver, II
*Assistant Examiner* — Travis Coolman (57) ABSTRACT

A hybrid electric vehicle with two separate drive systems. High speed operation is powered by self frequency ramping alternating current motors 107 within the wheel rims. Low speed operation is powered by hydraulic motors 102 directly coupled to the drive wheels. The hydraulic oil is pressurized by direct current motors/pumps 302 & 309 energized by a battery pack 106. The alternating current motors 107 are energized by mechanical or electronically generated alternating current. The hybrid power source is either a combustion engine 406 driving a poly-phased alternator 501 or a fuel cell 600 providing direct current. In the case of the combustion engine 406, a direct current helper motor/generator 404 will augment the engine with power from the battery pack 106 under large demands and charge the battery pack 106 under small demands. In the case of a fuel cell 600, the cell is augmented by the battery pack 106 under large demands and charges the battery pack 106 under small or no demands.

13 Claims, 6 Drawing Sheets

SELF FREQUENCY RAMPING ALTERNATING CURRENT WHEEL MOTOR SYSTEM FOR HYBRID VEHICLES

CROSS-REFERENCE TO RELATED APPLICATIONS

None

STATEMENT REGARDING FEDERALLY SPONSORED R & D

None

REFERENCE TO A SEQUENCE LISTING, ETC.

None

BACKGROUND OF THE INVENTION

1. Field of the Invention

The invention relates to hybrid vehicles having a fuel consuming source of power and a power storage unit. The vehicle is primarily driven by the power storage unit at speeds from 0 to a predetermined speed of around 35 MPH (hereafter called low speed) and the fuel consuming unit at speeds from around 35 to 70+ MPH (hereafter called high speed) with the ability of using both the fuel consuming source of power and the power storage unit for extended low or high speed operation. The invention also relates to different types of fuel sources for power. The fuel ranges from conventional gas/diesel internal combustion engines, hydrogen combustion engines to hydrogen fuel cells (referred to herein collectively as "constant power source"). The constant power source will charge the batteries when the vehicle drive system has little or no requirement for power.

The invention also relates to a vehicle that utilizes hydraulic motors for the low speed drive system and alternating current motors for the high speed drive system.

The invention also relates to direct drive vehicles that produce the mechanical energy, to propel the vehicle, at the wheels. In this case hydraulic energy to mechanical energy for low speed propulsion and electrical energy to mechanical energy for high speed propulsion.

2. Description of Prior Art

Typically hybrid and electric vehicles produce their mechanical energy on the chassis and then transfer that mechanical energy to the wheels through a transmission, drive shaft, differential and continuous velocity/universal joints. The vehicle drive system described below is unique because all mechanical energy is developed at the wheels. The required energy to power the wheels is transferred via electrical energy in wires or hydraulic energy in hoses. This not only eliminates the heavy, expensive and energy consuming power train; but also allows the various components to be arranged anywhere on the vehicle.

Most of the US Patented drive systems do not address, in detail, the modifications required to the chassis to allow installation of their inventions. Commercially marketed hybrid vehicles have crammed additional components into an already overloaded engine compartment. The components of their drive system are inaccessible and difficult to maintain or remove. This invention is designed to be used on any existing chassis. Everything is removed from the engine compartment with the exception of the brake master cylinder and windshield wiper system. All components installed are modular and are very accessible. They are easily removed by unplugging wires and/or disconnecting hoses.

Many of the patented hybrids use components not yet readily available to the vehicle industry. These patents are in anticipation of the development of such components (e.g. fuel cell) that can be used in a commercial vehicle. This invention's first embodiment utilizes "off the shelf" readily available components. The second embodiment progresses to a special combustion engine designed for hybrid vehicle use. The third embodiment modifies the vehicle to an all electric vehicle in anticipation of a low yield fuel cell and a safe hydrogen storage system. Further advantages will become apparent in the ensuing figures and detailed description.

BRIEF SUMMARY OF INVENTION

The invention discloses a unique hybrid vehicle that replaces any standard vehicle drive with a four module drive.

The power storage system is the first module and may consist of a battery bank, on board charging unit and a DC to DC converter. The battery bank will produce a voltage higher than conventional vehicles (approximately 100 volts). The onboard charging unit will use external 120 volt alternating current house current to charge the battery bank. The DC to DC converter will reduce the high DC voltage of the battery bank to approximately 12 volts for all the existing electrical and electronic equipment already installed on the chassis selected for installation or conversion.

The hydraulic low speed drive system is the second module. Most electric and hybrid vehicles use DC series or compound motors for drives because of their relatively good starting torque. Hydraulic motors have their best torque when starting. Thousands of pounds per square inch is available to accomplish this task. In this invention, the hydraulic system will go to standby any time the vehicle is not calling for low speed power. This is accomplished with a "free wheeling" feature that functions like a bicycle.

The constant power source system is the third module. The power provided by this module may be generated by a mechanical source (internal combustion engine) or a static source (fuel cell). During peak power requirements, the constant power source will be augmented by the power storage module and during small power requirements the constant power source will charge the power storage module. Most commercially available hybrid vehicles boast of an unlimited range but require large heavy engines and heavy expensive batteries. The target range for this invention is 250 miles before the battery bank requires charging. The engine in this invention is less than half the size and weight of those in commercially available hybrids. The second embodiment of the constant power source module will contain a unique internal combustion engine specifically design for hybrid application and will be most efficient at speeds below 1000 RPM. This low speed efficiency is accomplished by utilizing a multi-lob cam instead of a crank shaft.

The alternating current (AC) drive system is the fourth module. An AC motor's maximum torque is near (induction) or at (synchronous) its' operating frequency. When the AC is developed on board the vehicle, the frequency of the AC can be set as a function of the speed of the vehicle. Therefore, the drive motors are always at their best torque and efficiency for that frequency. When an alternator is used with a mechanical constant power source, it has a great advantage over the direct current (DC) drive systems commonly used in hybrids. That advantage is the large current used to drive the high speed system which can be controlled by adjusting the relatively small alternator field current. When solid state power amplifiers are used with a static constant power source, the current is controlled by individual power amplifiers for each AC motor field pole (about 28). The unique design of either AC drive systems eliminates the requirement for an expensive "controller" presently used on all commercially available hybrids.

The static constant power source (fuel cell) has two advantages over the mechanical AC drive system (internal combustion engine). The first is the ability to operate the high speed system without using the constant power source (as long as the batteries last). A vehicle may be converted using three modules (power storage, low speed drive and electronic high speed drive) and operate as an electric vehicle awaiting fuel cell technology to catch up. The second advantage of an electronic AC drive system is the ability to shut off the power amplifiers when the vehicle is coasting. This can be accomplished by using "Push-Pull" configured amplifiers biased below cut-off.

The modular construction is the greatest advantage over the present vehicle drive systems. Each module (power storage, hydraulic drive, constant power source and AC drive) require different types of expertise. Each discipline of engineering can work independently on increasing the efficiency of their module while decreasing the size and weight. The common goal is to use less fuel.

BRIEF DESCRIPTION OF THE SEVERAL VIEWS OF THE DRAWINGS

The included figures present a visual depiction of the unique method of powering a hybrid vehicle. They functionally illustrate the four sub-systems and the relationship they have to each other.

DRAWINGS

Reference Numerals

| | |
|---|---|
| 101. | HYDRAULIC PUMPS |
| 102. | HYDRAULIC MOTORS |
| 103. | CONSTANT POWER SOURCE |
| 104. | ALTERNATING CURRENT SOURCE |
| 105. | ONBOARD CHARGING UNIT |
| 106. | BATTERY BANK |
| 107. | ALTERNATING CURRENT MOTORS |
| 108. | POWER RECEPTACLE |
| 109. | FUEL TANK |
| 110. | POWER STORAGE MODULE |
| 111. | CONSTANT POWER SOURCE MODULE |
| 112. | ALTERNATING CURRENT DRIVE MODULE |
| 113. | HYDRAULIC DRIVE MODULE |
| 140. | MECHANICAL COUPLING |
| 150. to 155. | CABLES |
| 201. | BATTERY MODE SWITCH |
| 202. | DC TO DC CONVERTER |
| 250. to 253. | CABLES |
| 301. | PRIMARY MOTOR CONTACTOR |
| 302. | PRIMARY MOTOR/PUMP |
| 303. | RELAY UNIT |
| 304. | FLOW VALVE |
| 305. | DIRECTIONAL VALVE |
| 307. | PRESSURE REDUCING VALVE |
| 309. | BACK-UP MOTOR/PUMP |
| 310. | PRESSURE SWITCH |
| 311. | BACK-UP MOTOR CONTACTOR |
| 331. to 335. | HYDRAULIC HOSE |
| 352. to 357. | CABLES |
| 400. | ARMATURE CONTACTOR |
| 401. | FIELD PRESENT RELAY |
| 402. | SHUNT FIELD CONTROL UNIT |
| 403. | VOLTAGE REGULATOR |
| 404. | HELPER MOTOR/GENERATOR |
| 405. | ENGINE MODE SWITCH (two pole A & B) |
| 406. | COMBUSTION ENGINE |
| 407. | THROTTLE SERVO UNIT |
| 408. | ENGINE/WHEEL SYNCHRONIZING UNIT |
| 451. to 458. | CABLES |
| 501. | POLY-PHASE ALTERNATOR |
| 502. | CURRENT TRANSFORMER |
| 503. | ALTERNATOR FIELD CONTROL UNIT |
| 504. | ACCELERATOR PRESSURE POTENTIOMETER |
| 505. | HIGH SPEED ENABLE SWITCH |
| 506. | ALTERNATING CURRENT TACHOMETER |
| 551. to 556. | CABLES |
| 601. | FUEL CELL |
| 602. | PRE-AMPLIFIERS |
| 603. | POWER AMPLIFIERS |
| 604. | POLY PHASE TACHOMETER |
| 605. | POLY PHASE POTENTIOMETER |
| 651. to 656. | CABLES |

DETAILED DESCRIPTION OF THE INVENTION

Figure 1:
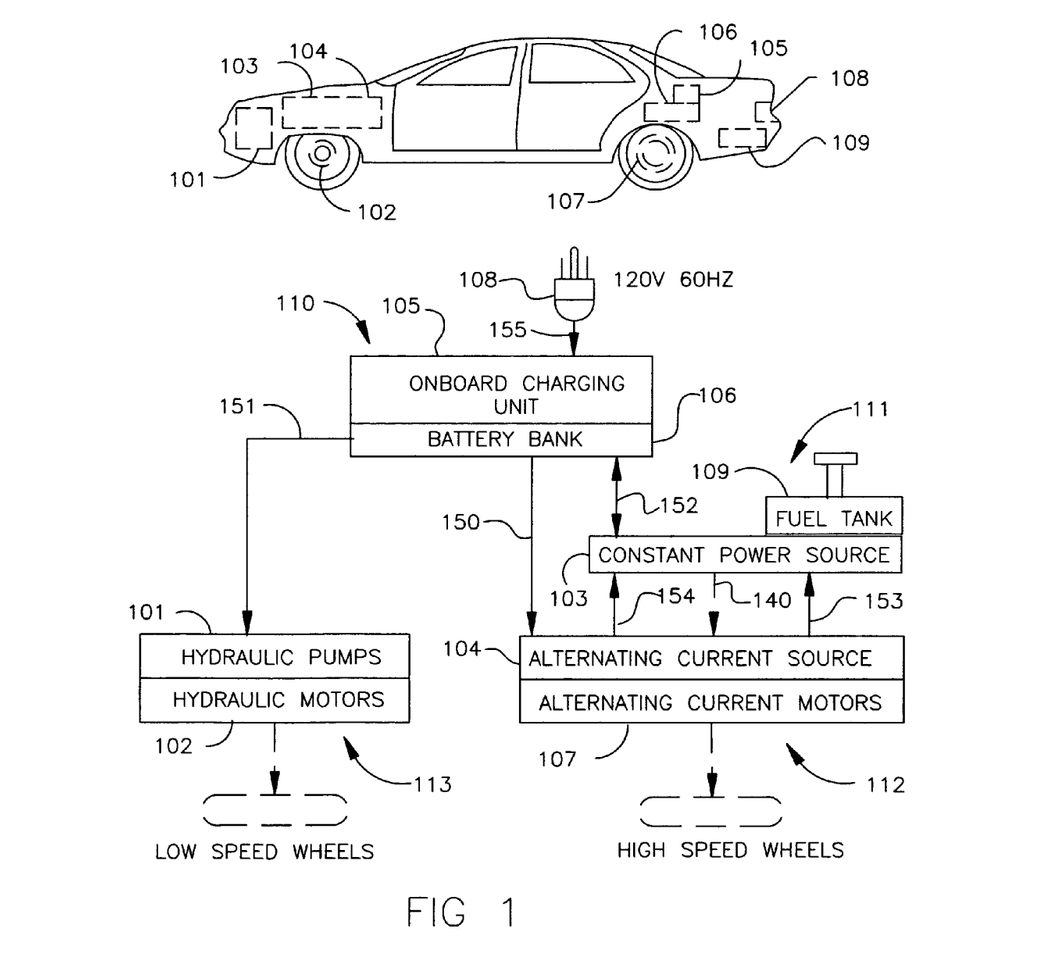
FIG. 1 is a notional arrangement of the major components of the drive systems on an existing chassis and a functional block diagram illustrating the major components of the four modules.

The pictorial portion of FIG. 1 is a notional depiction of an existing chassis with the conventional front wheel drive system removed and the invented systems installed. The hydraulic motors 102 are mounted on the front wheels where the drive shafts were removed. The hydraulic pumps 101 are located in the engine compartment forward of the front wheels. The constant power source 103 and the alternating current source 104 are located in the space vacated by the conventional combustion engine and transmission. The battery bank 106 and onboard charging unit 105 are located behind the rear seat. The alternating current motors 107 are located between the oversized tire rims and the brakes. The power receptacle 108, for externally charging the batteries, is located behind the number plate bracket. The existing fuel tank 109 is used for liquid fuel applications but must be replaced for hydrogen. Again the pictorial is a notional arrangement to an existing chassis, the component location is flexible and at the discretion of the installing activity.

The functional block diagram portion of FIG. 1 illustrates the units that make up the four modules of the power drive system and the flow of energy between them. The battery bank 106, on board charging unit 105, and power receptacle 108 along with their associated circuitry make up the Power Storage Module 110. The constant power source 103, fuel tank 109 and their associated circuitry and fuel delivery make up the Constant Power Source Module 111. The hydraulic pumps 101 and hydraulic motors 102 along with their associated circuitry and piping make up the Hydraulic Drive Module 113. The alternate current source 104, alternate current motors 107 and their associated circuitry make up the Alternate Current Drive Module 112.

The energy required to operate the low speed hydraulic drive module 113 is provided by the power storage module 110 via cable 151. During excessive low speed demands, the constant power source module 111 augments the power requirement via cable 152. The energy required to operate the high speed alternating current drive module 112 is provided mechanically by the constant power source module 111 via shaft 140. The power storage system module 110 can augment the power requirement of the alternating current drive module 112 via cable 150 during excessive high speed demands. During little or no power demand from the drive systems, the constant power source module 111 charges the power storage module 110 via cable 152.

Figure 2:
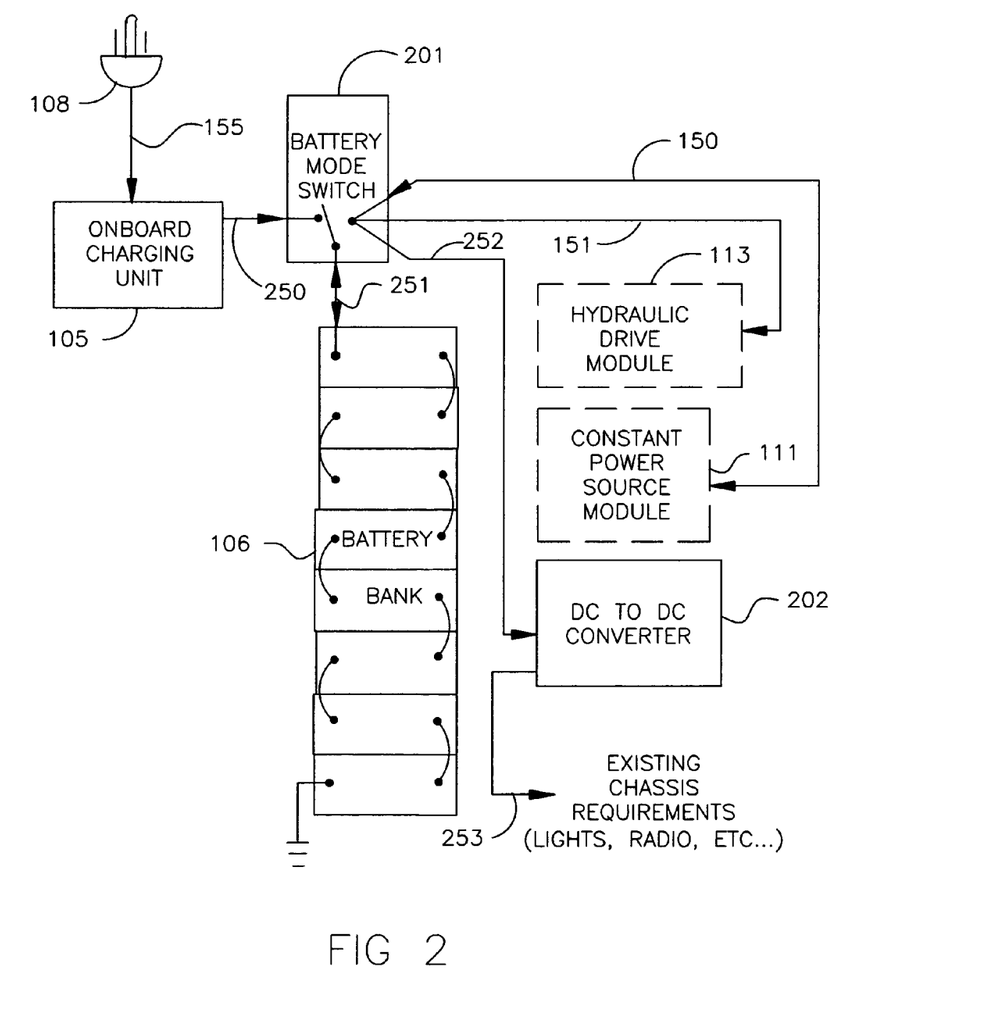
FIG. 2 is a detailed functional block diagram of the "Power Storage module".

The power storage module functional block diagram FIG. 2 is shown with the battery mode switch 201 in the external charge position. The 120 volt AC house current enters the system at power receptacle 108, passes through cable 155, to the onboard charging unit 105. The charging current will pass through cable 250, the contacts of the battery mode switch 201 and cable 251 to the battery bank 106. When the battery mode switch 201 is placed in the operate position, the power leaves the battery bank 106 through cable 251 in the other direction to the battery mode switch 201. The current will then be delivered to the other modules via cables 150 & 151. The final component of the power storage module 110, the DC to DC converter 202, receives its' power from cable 252. The function of the DC to DC converter 202 is to reduce the high voltage of the battery bank 106 to the customary 13.6 volts (hereafter called low DC voltage) used by the conventional automotive chassis via cable 253.

Figure 3:
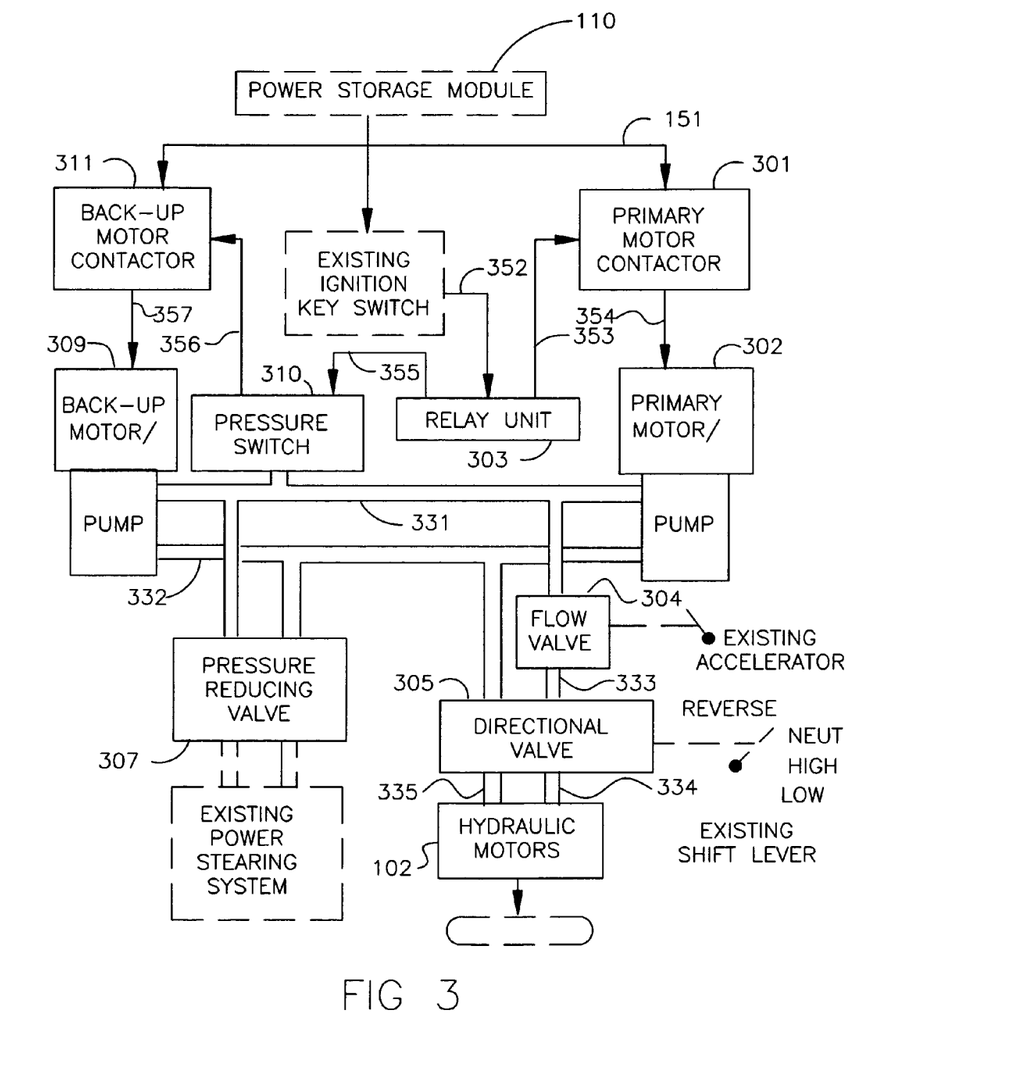
FIG. 3 is a detailed functional block diagram of the "Low Speed Hydraulic Drive module".

The two stage low speed Hydraulic Drive Module 113 is functionally illustrated in FIG. 3. The primary motor/pump 302 is a relatively low power consuming unit (5 HP) for normal driving at low speeds. The back-up motor/pump 309 is a more powerful unit (7.5 HP) and is used to augment the primary motor/pump 302 during large demand periods of low speed operation. The system utilizes the standard key switch existing in all vehicles. When the existing ignition key switch is turned to the "Start" position, low DC voltage is sent to the relay unit 303 via cable 352. The relay unit 303 will energize and will remain energized until the key switch is turned to the "Off" position. The relay unit 303 will then allow low DC voltage to the primary motor contactor 301 via cable 353. When the primary motor contactor 302 energizes the power from the power storage module 110, available by cable 151, will be sent to the primary motor/pump 301 via cable 354. At the same time, the relay unit 303 will allow low DC voltage to the pressure switch 310 via cable 355. The energy will pass through the normally closed contacts of the pressure switch 310 to the back-up motor contactor 311 via cable 356. When the back-up motor contactor 311 is energized, the power from the power storage module 110, available by cable 151, will be sent to the back-up motor/pump 309 via cable 357. Both the primary motor/pump 302 and the backup motor/pump 309 will start to charge the hydraulic oil in the high pressure hose assembly 331. Before the pressure in the high pressure hose assembly 331 reaches normal operating pressure, the pressure switch 310 will open the normally closed contacts at a preset value of 1800 lbs. This will disconnect the energy to the back-up motor contactor 311 causing the back-up system to shut down. The primary motor/pump 302 will continue to bring the hydraulic pressure to its' normal operating range of 2000 lbs. Hydraulically, the high pressure oil will be contained in hose assembly 331 and the oil will be returned to the pumps via hose assembly 332. Flow valve 304 is mechanically connected to the existing accelerator pedal. Foot pressure on the pedal determines how much hydraulic oil will be allowed to flow from the high pressure hose assembly 331 to the directional valve 305 via hose 333. The directional valve 305 is mechanically connected to the existing shift lever. When the shift lever is placed in the low range, high pressure hydraulic oil will be applied to the hydraulic motors 102 via hose assembly 334 where the pressure will be converted to mechanical motion. The expended oil will return from the hydraulic motors 102 via hose assembly 335 to the directional valve 305 where it will be ported to the return hose assembly 332. Conversely, when the shift lever is in the reverse range, the directional valve 305 will port high pressure oil to the hydraulic motors 102 via hose assembly 335 and port the expended oil from hose assembly 334 to the return hose assembly 332. This will cause the hydraulic motors 102 to rotate in the opposite direction. The last unit of the hydraulic drive module is the pressure reducing valve 307. It receives high pressure hydraulic oil from the high pressure oil hose assembly 331 and reduces the pressure to meet the requirement of the existing hydraulic power steering systems (if installed in target chassis).

Figure 4:
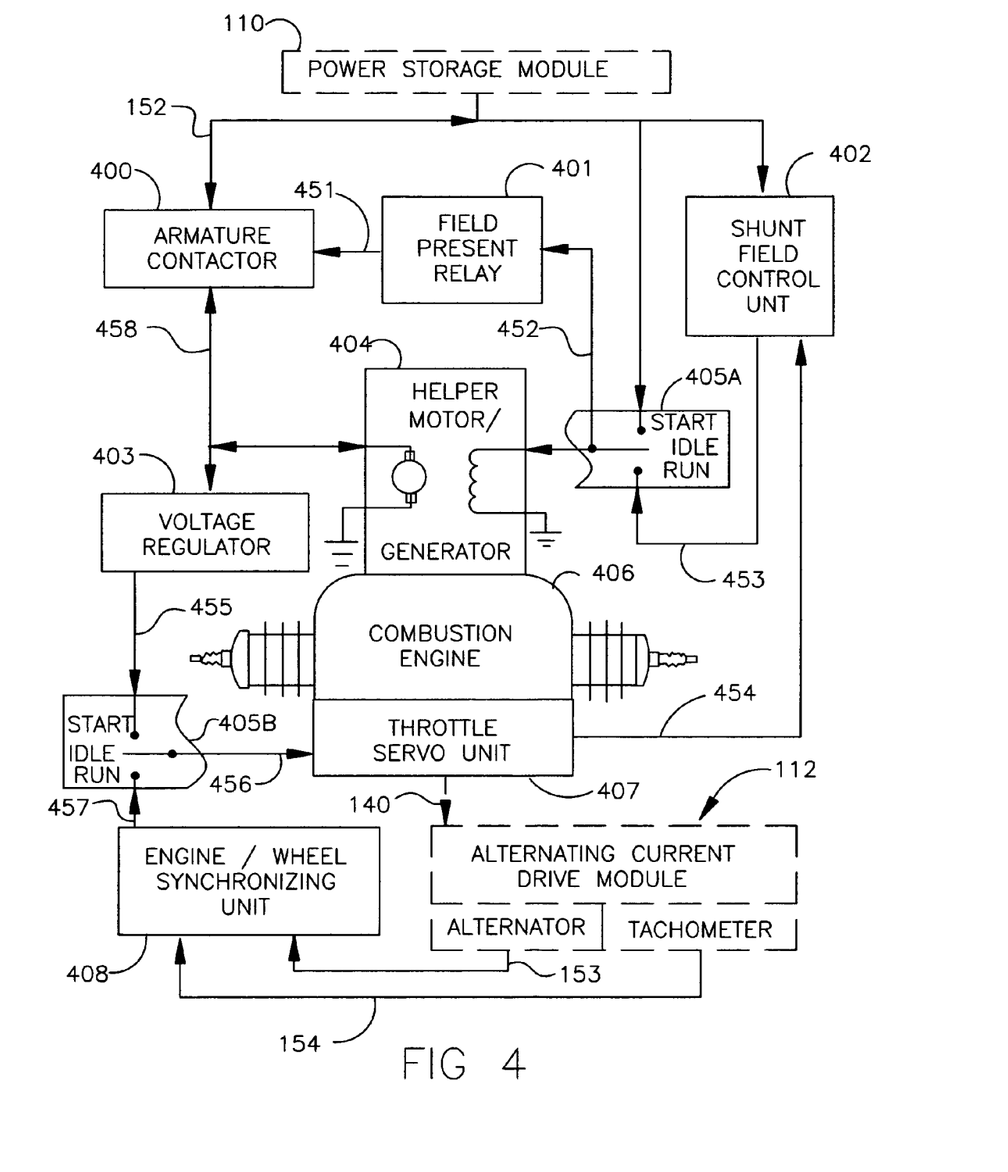
FIG. 4 is a detailed functional block diagram of a "Constant Power Source module" with an Internal Combustion Engine.

The constant power source module 111 illustrated in FIG. 4 utilizes a mechanical internal combustion engine to provide the constant power. The engine is started by placing the engine mode switch 405 (A&B) in the "Start" position. The power storage module 110 will then apply power to the helper motor/generator 404 shunt field via mode switch 405A and cable 152 & 452. At the same time power is applied to the field present relay 401 via cable 452. The field present relay 401 accomplishes the critical function of preventing power to be applied to the helper motor/generator 404 armature without a magnetic field present. When the field present relay senses a field is present, it allows power to the armature contactor 400 via cable 451. The armature contactor will energize allowing power, provided by the power storage module 110 via cable 152, to the helper motor/generator 404 armature via cable 458. The helper motor/generator 404 will now turn over the combustion engine 406 until it starts. Upon starting, the combustion engine 406 will increase in speed until helper motor/generator 404 becomes a generator and provides a direct current voltage that is approximately 15% higher than the normal battery bank voltage. At that time the helper motor/generator 404 will provide charging power to the power storage module 110 via cable 458, armature contactor 400 and cable 152. A sample of the generated voltage will be provided to the voltage regulator 403 via cable 458. When the voltage regulator 403 senses a voltage greater than the above mentioned level; a signal will be sent to the throttle servo unit 407 via cable 455, engine mode switch 405 B and cable 456 to reduce the throttle pressure. Conversely, when the voltage regulator 403 senses a voltage less than above mentioned level, a signal will be sent to the throttle servo unit 407 to increase the throttle pressure via the same route.

When the engine mode control switch 405 (A & B) is placed in the "Idle" position, the field present relay 401 will sense a loss of power and will remove the power to the armature contactor 400 causing it to de-energize. Likewise, the throttle servo unit 407 will lose its' signal and will automatically reduce the throttle pressure to the lower limit causing the combustion engine 406 to reduce its' speed to an idle.

When the mode control switch 405 (A & B) is placed in the "Run" positing, the throttle servo unit 407 is controlled by the engine/wheel synchronizing unit 408 via cable 457 and 456. The throttle pressure is now dependant on the speed of the wheels. An alternating current signal, whose frequency is proportional to the speed of the wheels, is provided to the engine/wheel synchronizing unit 408 from the alternating current drive module 112 via cable 154. A sample of the frequency being generated by the alternator in the alternating current drive module 112 is also provided to the engine/wheel synchronizing unit 408 via cable 153. Now that the speed of the helper motor/generator 404 is controlled solely by the speed of the wheels, an other unit is required to adjust the shunt field to maintain the counter EMF (electro motive force) at the power storage system's voltage level + or −15%. A signal proportional to the throttle pressure is sent from the throttle servo unit 407 to the shunt field control unit 402 via cable 454. When the combustion engine 406 is under high demand (accelerating in high speed) the throttle pressure will increase. The signal from the throttle servo unit 407 will cause the shunt field control unit 402 to decrease the power to the helper motor/generator 404 shunt field via cable 453. The reduction in shunt field strength will turn the unit into a motor to augment the combustion engine 406. Conversely, when the combustion engine 406 has little or no demand the throttle pressure will decrease. The signal sent from the throttle servo unit 407 via cable 454 will cause the shunt field control unit 402 to increase the power to the helper motor/generator 404 shunt field via cable 453. The increase in magnetic field strength will turn the unit into a generator to charge the power storage module 110.

Figure 5:
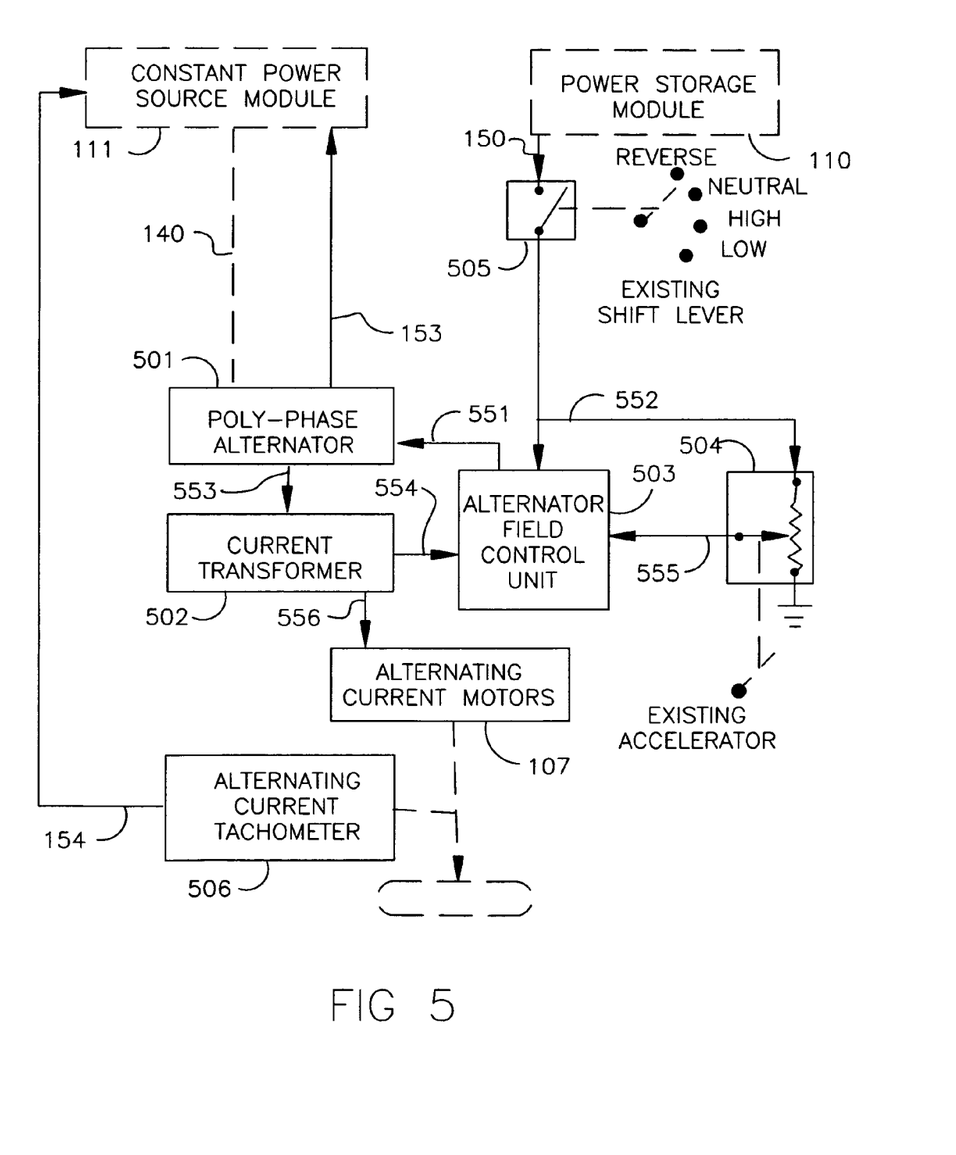
FIG. 5 is a detailed functional block diagram of the "High Speed Alternating Current Drive module".

The alternating current drive module 112 functionally illustrated in FIG. 5 receives it operating power from the constant power source module 111 via mechanical coupling 140. This high speed drive can not operate without an operating constant power source module 111. This is unlike the aforementioned low speed hydraulic drive module 113 that can function from the power storage module 110 alone. The power output of the poly-phase alternator 501 is controlled by the alternator field control unit 503 via cable 551. The alternator field control unit 503 is energized only when the shift lever is in the High range via cable 150, high speed enable switch 505 and cable 552. Accelerator pressure potentiometer 504 provides a direct current signal proportional to the position of the accelerator to the alternator field control unit 503 via cable 555. The signal will proportionally control the field strength of the poly-phase alternator 501 via cable 551. The electrical power generated by the poly-phase alternator 501 must pass through the current transformer 502 before it reaches the alternating current motors 107 via cables 553 & 556. The current transformer 502 monitors the alternating current being used and sends a negative feedback to the alternator field control unit 503, via cable 554, to keep the current with-in the alternating current motors 107 specifications. The alternating current motors 107, directly attached to the vehicle's drive wheels, not only drive the wheels but also are mechanically coupled to the alternating current tachometer 506. The tachometer produces an alternating current feedback signal, to the constant power source module 111, via cable 154, with a frequency that is proportional to the wheel speed. Likewise, cable 153 provides a feedback signal to the constant power source module 111 with a frequency that is proportional to the poly-phase alternator's 501 speed. The two above signals effect on the constant power source module 111 was previously explained during the explanation of that module.

Figure 6:
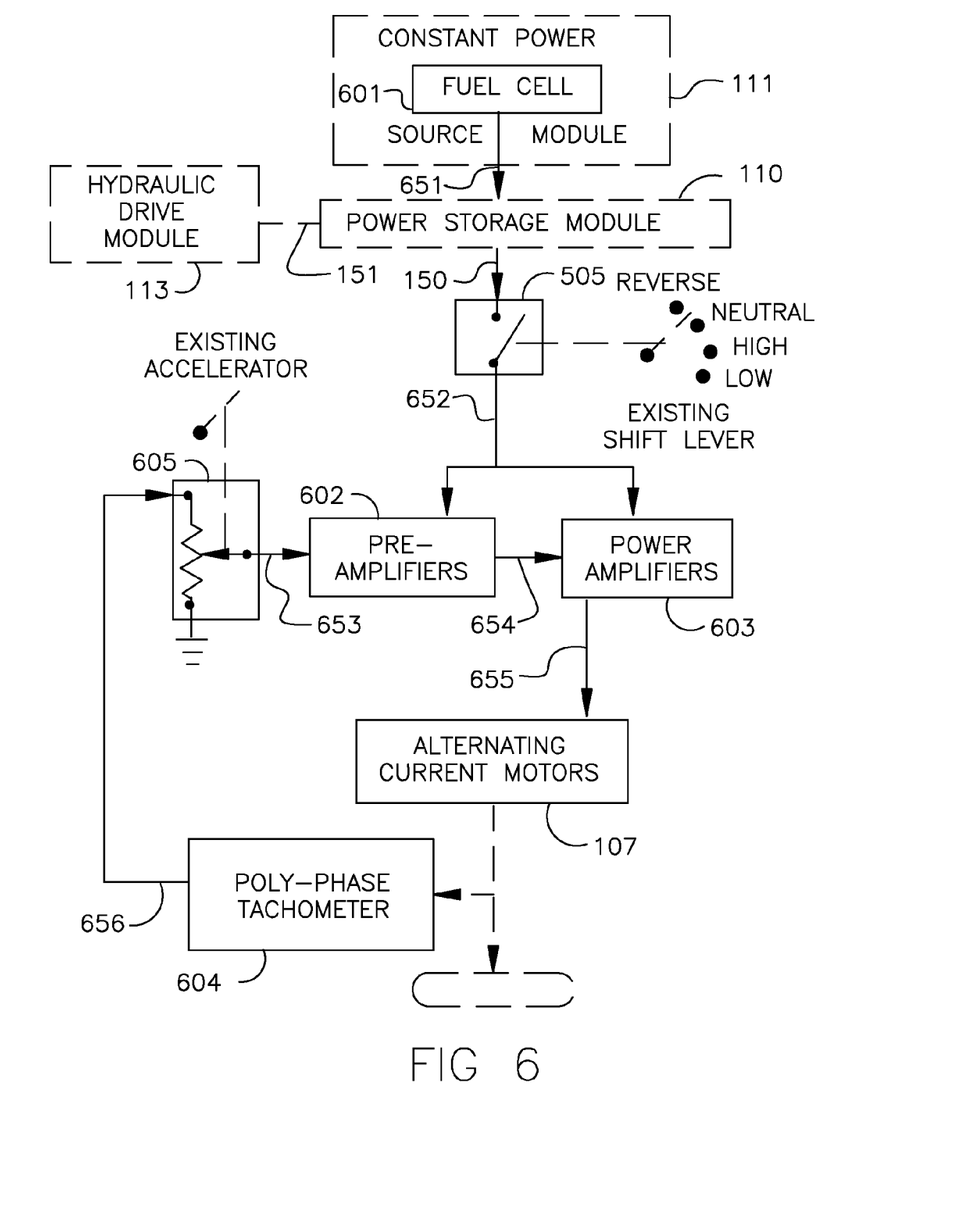
FIG. 6 is a detailed functional block diagram of the changes required to update the "Constant Power Source module" from an internal combustion engine to a fuel cell.

The updated constant power source module 111 illustrated in FIG. 6 utilizes a fuel cell 601 that eliminates the need of any drive system mechanical devices on the chassis. All required drive system mechanical energy is generated at the wheels. The fuel cell 601 feeds its' power directly to the power storage module 110 via cable 651. This update required no changes to the hydraulic drive module 113 or power storage module 110. The only components retained in the old constant power source module 111 and alternating current drive module 112 are the high speed enable switch (piece 505 of FIG. 5) and the alternating current motors (piece 107 of FIG. 5).

The upgraded alternating current drive module 112 illustrated in FIG. 6 uses a poly-phase tachometer 604 to supply the reference signal with a frequency that is proportional to the wheel speed via cable 656. The potentiometer unit 605 (one potentiometer per phase) supplies a signal to the pre-amplifiers 602, via cable 653, with an amplitude that is proportional to the accelerator pressure. The pre-amplifier and the power amplifier receive there operating power from the power storage module 110 via cable 150, high speed enable switch 505 and cable 652 only when the existing shift lever is in the high position. The pre-amplifiers 602 increase the power of the signal to drive the power amplifiers 603 via cable 654. The power amplifiers 603 (one per field pole of the alternating current motors 107) now supply the electrical energy to the existing alternating current motors 107.

What is claimed is:

1. A passenger vehicle comprising:
    a self frequency ramping alternating current drive system to propel said vehicle from a predetermined speed to over seventy miles an hour;
    a hydraulic drive system to start and propel said vehicle to said predetermined speed;
    a power storage system to provide direct current to said hydraulic drive system and said alternating current drive system;
    a fuel consuming constant power source system to provide energy to said alternating current drive system, said hydraulic drive system and said power storage system;
    means for selectively activating said hydraulic drive system and said alternating current drive system;
    whereby neither said hydraulic drive system nor said frequency ramping alternating current drive system require a transmission or a differential to propel said vehicle.

2. The vehicle of claim 1 further comprising a chassis and suspension wherein said alternating current drive system has a plurality of alternating current motors directly attached to a plurality of alternating current drive wheels with a fixed one to one speed ratio whereby transfer of mechanical energy from the chassis to the suspension is substantially eliminated.

3. The vehicle of claim 2 wherein said alternating current drive system comprises power amplifiers, said power amplifiers providing power to said alternating current motors.

4. The vehicle of claim 3 wherein said power amplifiers receive a reference signal from a poly-phase tachometer whose output frequency is a function of rotating speed of said alternating current drive wheels.

5. The vehicle of claim 1 wherein said constant power source system comprises an internal combustion engine for hybrid application.

6. The vehicle of claim 5, wherein the internal combustion engine revolutions per minute is controlled by an engine/wheel synchronizing unit receiving input signals from an alternating current tachometer and a poly phase alternator, thereby maintaining an output of the poly phase alternator at a peak torque and efficiency at and above the predetermined speed.

7. The vehicle of claim 1 further comprising a chassis and suspension wherein said hydraulic drive system has a plurality of hydraulic motors directly attached to a plurality of hydraulic drive wheels with a fixed one to one speed ratio whereby transfer of mechanical energy from the chassis to the suspension is substantially eliminated.

8. The vehicle of claim 1 wherein said constant power source system comprises a fuel cell that generates direct current to augment said hydraulic drive system and said alternating current drive system or charge said power storage system.

9. The vehicle of claim 1, wherein said hydraulic drive system and said alternating current drive system are independent, allowing them to be operated individually or concurrently at said predetermined speed thereby allowing a seamless exchange from below the predetermined speed to above the predetermined speed.

10. A method of efficiently propelling a passenger vehicle with two independent energy sources comprising the steps of:
providing frequency ramped alternating electrical current energy for propelling said vehicle at high speed;
causing said vehicle to accelerate using said alternating electrical energy from a predetermined speed to over seventy miles an hour;
providing hydraulic energy for propelling said vehicle at low speed;
causing said vehicle to accelerate using said hydraulic energy from zero miles per hour to said predetermined speed;
comprising a shifting method of selectively expending said hydraulic energy and said electrical energy depending on said vehicle's speed relative to said predetermined speed whereby the said vehicle's fuel efficiency is substantially increased.

11. The method of claim 10 wherein said hydraulic energy and said electrical energy are delivered directly to a plurality of hydraulic motors and a plurality of alternating current motors, respectively, that are directly connected to a plurality of drive wheels, with a fixed gear ratio, whereby neither a transmission nor a differential is required to expend said hydraulic energy and said electrical energy.

12. The method of claim 10 wherein the providing of said hydraulic energy and said electrical energy is controlled only by switches and relays.

13. The method of claim 10, wherein the providing of hydraulic energy and the providing of electrical energy are independent allowing them to be provided individually or concurrently at said predetermined speed thereby allowing a seamless exchange from low speed to high speed.

* * * * *